(12) United States Patent
Oh

(10) Patent No.: US 8,107,930 B1
(45) Date of Patent: Jan. 31, 2012

(54) METHOD AND SYSTEM FOR INITIATING A COMMUNICATION SESSION

(75) Inventor: DaeSik Oh, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1145 days.

(21) Appl. No.: 11/842,270

(22) Filed: Aug. 21, 2007

(51) Int. Cl.
H04M 3/42 (2006.01)
(52) U.S. Cl. .................................................. 455/414.1
(58) Field of Classification Search ............... 455/414.1, 455/418–420; 707/737, 951
See application file for complete search history.

(56) References Cited

U.S. PATENT DOCUMENTS

| | | | |
|---|---|---|---|
| 7,099,862 B2 | 8/2006 | Fitzpatrick et al. | |
| 7,120,424 B1 | 10/2006 | Coan et al. | |
| 7,139,806 B2 | 11/2006 | Hayes et al. | |
| 2002/0107045 A1* | 8/2002 | Gancarcik et al. | 455/556 |
| 2003/0224762 A1* | 12/2003 | Lau et al. | 455/412.2 |
| 2004/0198329 A1 | 10/2004 | Vasa | |
| 2005/0053220 A1 | 3/2005 | Helbling et al. | |
| 2005/0059418 A1* | 3/2005 | Northcutt | 455/517 |
| 2005/0157858 A1 | 7/2005 | Rajagopalan et al. | |
| 2005/0170845 A1* | 8/2005 | Moran | 455/456.1 |
| 2005/0226403 A1 | 10/2005 | Lenard | |
| 2006/0075044 A1 | 4/2006 | Fox et al. | |
| 2006/0281449 A1 | 12/2006 | Kun et al. | |
| 2007/0038720 A1 | 2/2007 | Reding et al. | |
| 2008/0126510 A1* | 5/2008 | Golobrodsky et al. | 709/217 |
| 2008/0133580 A1* | 6/2008 | Wanless et al. | 707/102 |
| 2008/0319823 A1* | 12/2008 | Ahn et al. | 705/10 |

* cited by examiner

*Primary Examiner* — Steven Lim

(57) ABSTRACT

A method is provided in a network for initiating a communication service. Upon receiving an access request at a service node from a device to access a contact list, a contact list is provide to the device where the contact list has one or more contacts associated with contact information. The service node receives a selection request from the device where the selection request includes selecting one of the one or more contacts from the contact list. The service node then sends a calling instruction to the device wherein the calling instruction comprises initiating a communication session from the device using the contact information.

28 Claims, 6 Drawing Sheets

METHOD AND SYSTEM FOR INITIATING A COMMUNICATION SESSION

TECHNICAL FIELD

The invention is related to the field of communications, and in particular, to initiating communication services from a device utilizing a network server.

TECHNICAL BACKGROUND

Mobile devices such as cellular telephones, Personal Digital Assistants (PDAs) and other wireless communication devices store contact lists utilized by users of such devices. Contact lists such as phone or address books allow users to store and dial numbers in a convenient manner. Many of these devices also allow for calendaring functionality such as through an electronic calendar or task list. Traditionally, contact lists and calendars are stored on the device itself.

Storing contact information on a handset works well if the user only has one device. Many users of mobile technology, however, subscribe to and use multiple devices. Also, groups of users, such as families and business associates share mobile services using multiple devices. Many times, a user or group of users may want to share and have access to contact and calendar information that is stored on a particular device. One solution is to store such information at a central location, such as a network server, so that users can obtain access to this information from any number of devices and not just the device where the information is stored. Unfortunately, if a user wants to place a call to a contact that is stored on the network server, the user must perform multiple steps, such as typing the number or downloading the number and looking up the number on the device, before eventually placing the call from the handset.

Mobile technology also allows for users to provide location information to the network. For example, E911 services require knowing the location of the mobile unit when a 911 call is placed to the network. Further, commercial applications such as mapping and phone book programs exist that allow users to obtain location and contact information for a variety of goods and services using the Internet or other public networks. Unfortunately, integrating a calendar and location information of the handset and third-parties with a contact list and placing calls from a handset utilizing this information, however, requires accessing multiple applications and performing multiple steps before placing the call.

TECHNICAL SUMMARY

Generally described, a method and system are provided for initiating a communication service. Upon receiving an access request at a service node from a device to access a contact list, a contact list is provide to the device where the contact list has one or more contacts associated with contact information. The service node receives a selection request from the device where the selection request includes selecting one of the one or more contacts from the contact list. The service node then sends a calling instruction to the device where the calling instruction includes initiating a communication session from the device using the contact information.

In another embodiment, a method is provided for initiating a communication service. Upon receiving an access request at a service node from a device to access a contact list, the contact list is provided to the device where the contact list has one or more contacts. The service node then associates contact information with each of the one or more contacts. When service node receives a selection request from the device that includes selecting one of the one or more contacts from the contact list, the service node sends a calling instruction to the device where the instruction includes initiating a call from the device using the contact information.

In yet another embodiment, a method is provided for associating the contact information with each of the one or more contacts. A device location and contact location are determined and the contact information is associated with each of the one or more contacts based upon the respective locations.

In one embodiment, another method is provided for associating the contact information with each of the one or more contacts. An access time is determined for the access request. A calendar is provided that includes an event time window and the contact information. If the access time is within the event time window, the contact information is associated with the contact.

DETAILED DESCRIPTION

Figure 1:
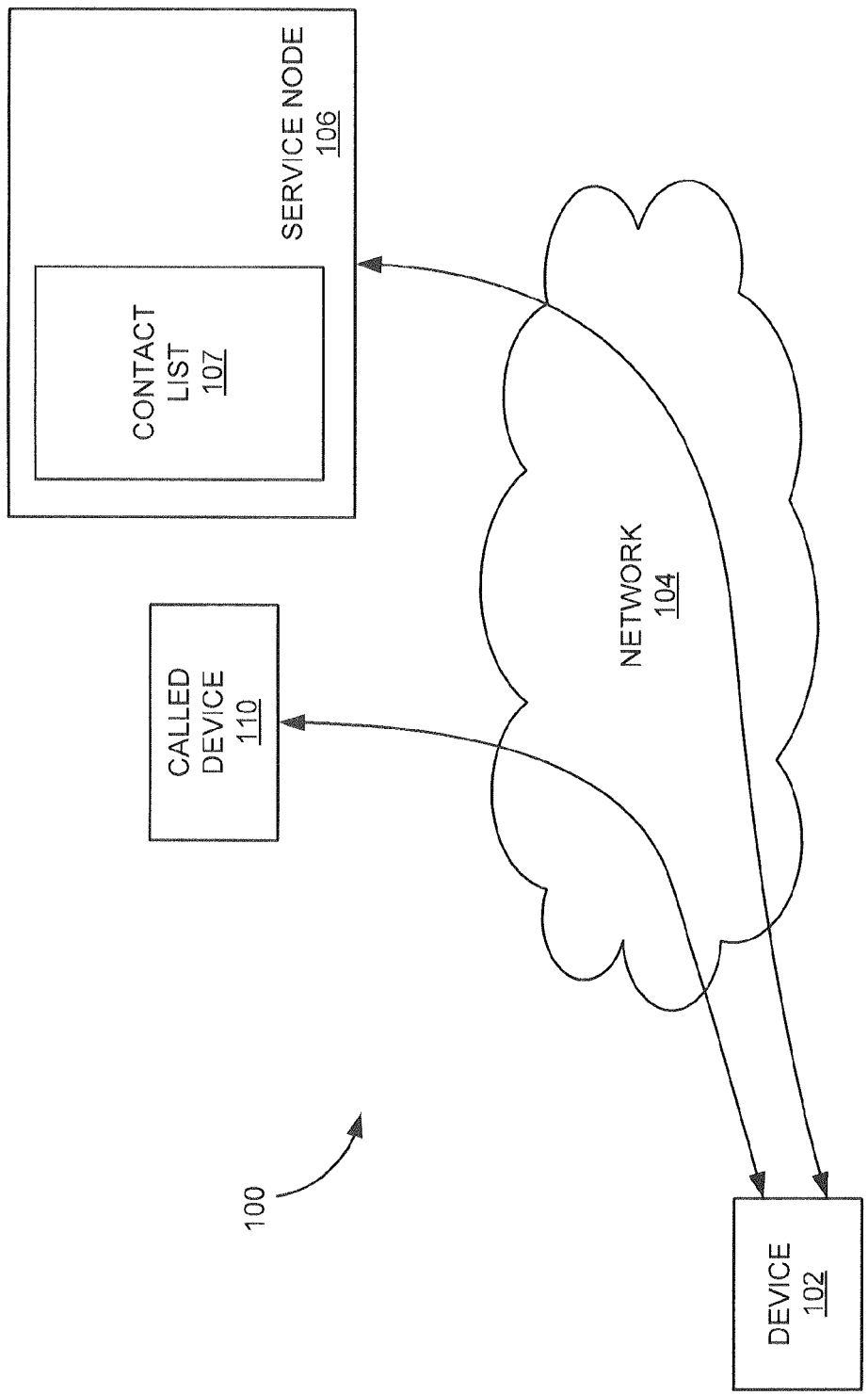
FIG. 1 is a block diagram illustrating a communication system for initiating a communication session at a device.

Referring to FIG. 1, the operating environment of communication system 100 includes device 102, network 104, service node 106, contact list 107 and called device 110. Device 102 exchanges information with service node 106 and contact list 107 via network 104. Device 102 also exchanges information with called device 110 via network 104.

Device 102 and called device 110 may be any device that has communication connectivity. Device 102 and called device 110 could include wire line or wireless devices such as telephones, smartphones, mobile phones, cellular phones, personal digital assistants (PDAs), personal communicators, handheld game consoles, personal computers (PCs), Ultra-Mobile personal computers (UMPCs), handheld televisions and any other consumer appliance with communication capabilities.

Network 104 includes any type of communications network. Network 104 could be any packet-based network or packet switching system where packets are routed over data links shared with other traffic. Characteristics of packet-based networks include optimizing channel capacity available in a network, minimizing transmission latency and increasing robustness of communication. For example, network 104 could include many of the public switched data networks (PSDNs) such as the internet protocol network, Frame Relay, Asynchronous Transfer Mode (ATM), General Packet Radio Service (GPRS), Ethernet and others. Network 104 could also include any number of private data networks that would utilize similar protocols.

Network 104 could also comprise any circuit-based communications network including the public switched telephone network (PSTN). Circuit-switching networks may be characterized as communication networks that establish dedicated circuits or channels between nodes and terminals to enable users to communication with one another.

Service node 106 comprises any computer system configured with software that functions as described herein that has the ability to exchange information via network 104 to mobile device 102. Service node 106 could be comprised of a programmed general-purpose computer, although those skilled in the art will appreciate that programmable or special purpose circuitry and equipment may be used. Service node 106 may also be distributed among multiples platforms or devices.

Contact list 107 includes one or more names that have associated contact information. Contact information may include telephone numbers, email addresses, physical or geographic addresses, fax numbers and any other information that could be associated with the identity of a person. Contact list 107 may also include other data including a calendar or task list that is associated with a person. Contact list 107 may reside on a single platform at service node 106 or across multiple platforms or devices.

Figure 2:
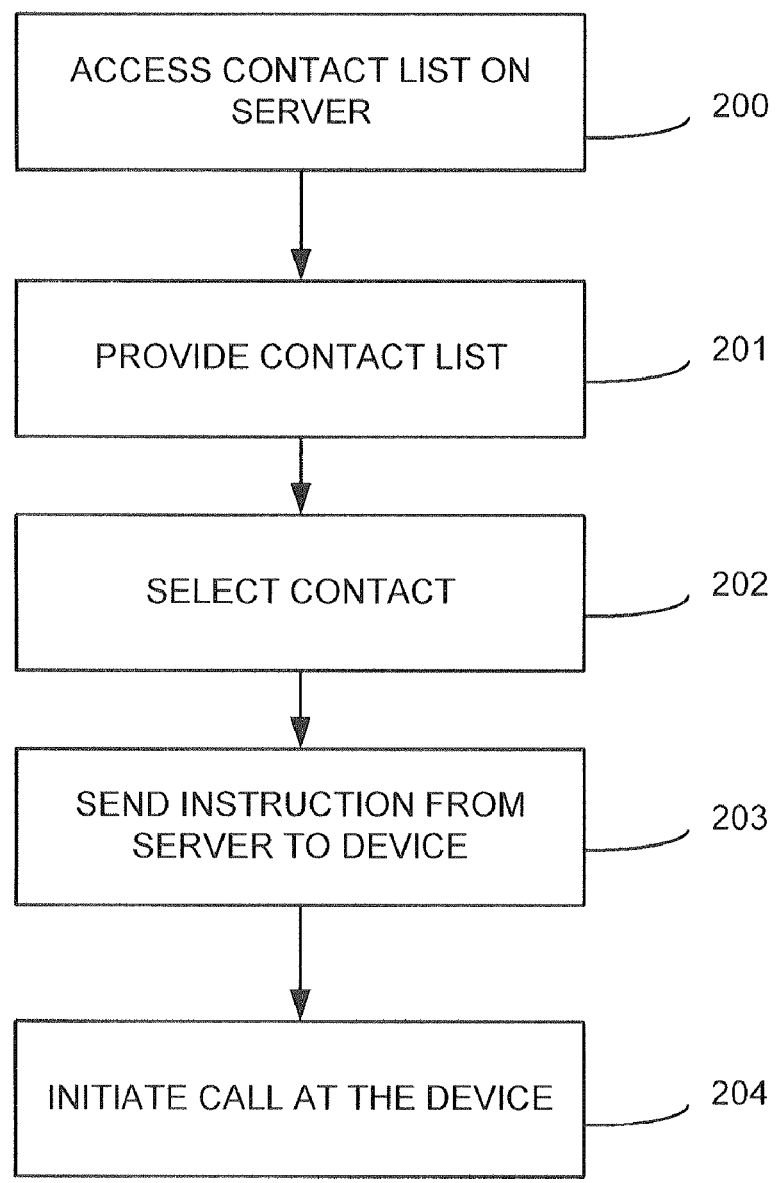
FIG. 2 is a flow diagram illustrating a method for initiating a communication session.

In operation, as illustrated in FIG. 2, service node 106 receives an access request from device 102 to access contact list 107 (200). Service node 106 then provides contact list 107 to device 102 (201). Contact list 107 provided to device 102 includes one or more contacts that are associated with contact information. The user then selects one of the one or more contacts on contact list 107 that is provided to service node 106 (202). Service node 106 then sends a calling instruction to device 102 (203). The calling instruction includes the contact information of the selected contact. Device 102 then initiates a call to called device 110 using the calling instruction provided by service node 106 (204).

Figure 3:
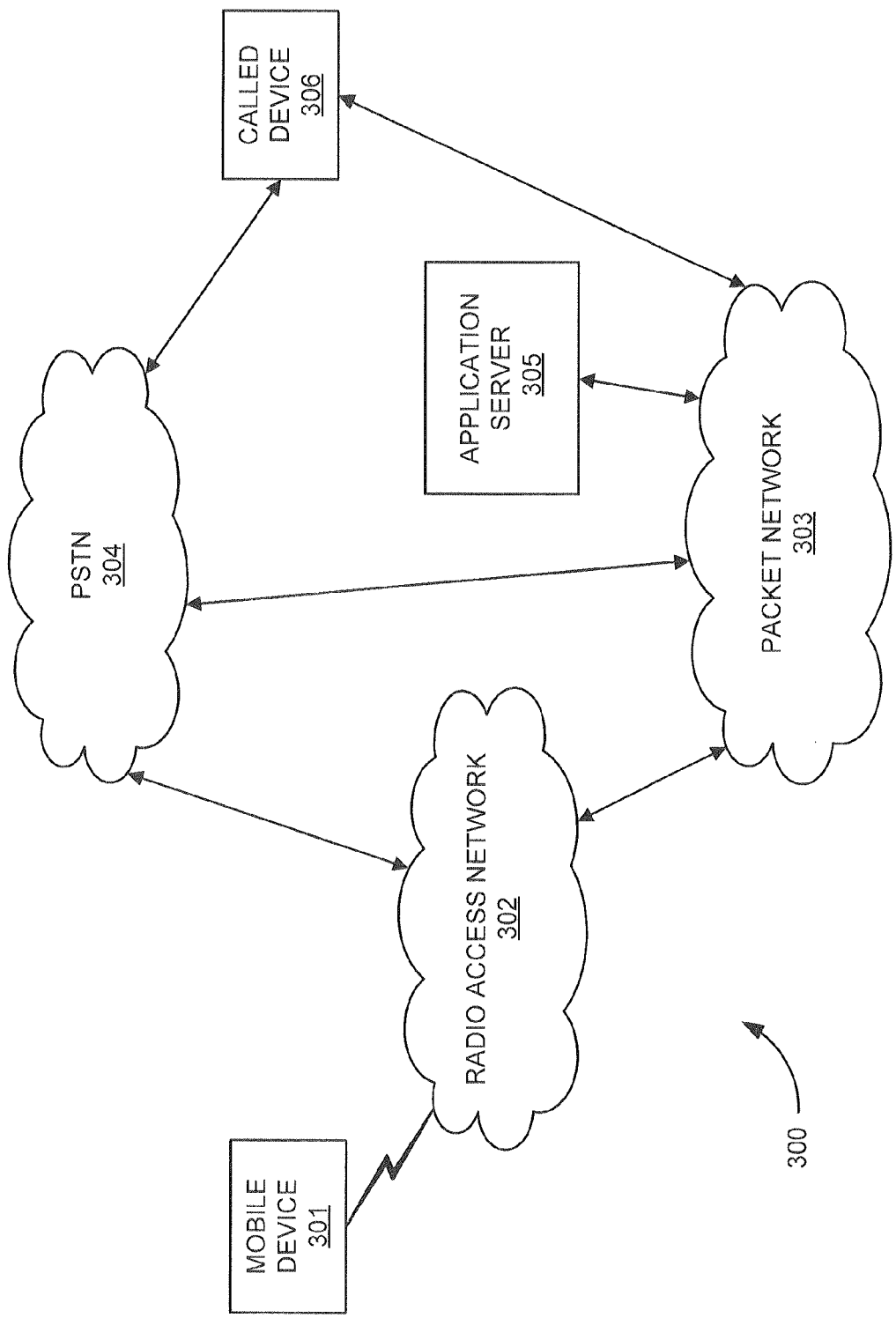
FIG. 3 is a block diagram illustrating an embodiment of a communication system for initiating a communication session at a device.

In one example as shown in FIG. 3, communication system 300 includes mobile device 301, radio access network (RAN) 302, packet network 303, PSTN 304, application server 305 and called device 306. Mobile device 301 exchanges information with service node 305 utilizing packet network 303. Mobile device 301 communicates with called device 306 using either PSTN 304 or packet network 303 or some combination of these networks.

Mobile device 301 may be any device that has wireless communication connectivity. Mobile device 301 could include any number of wireless devices such as smartphones, mobile phones, cellular phones, personal digital assistants (PDAs), personal communicators, handheld game consoles, personal computers (PCs), Ultra-Mobile personal computers (UMPCs), handheld televisions and any other consumer appliance with wireless communication capabilities.

Packet network 303 could be any packet-based network or packet switching system where packets are routed over data links shared with other traffic. Characteristics of packet-based networks include optimizing channel capacity available in a network, minimizing transmission latency and increasing robustness of communication. For example, packet network 303 could include many of the public switched data networks (PSDNs) such as the internet protocol network (Internet), Frame Relay, Asynchronous Transfer Mode (ATM), General Packet Radio Service (GPRS), Ethernet and others. Packet network 303 could also include any number of private data networks that would utilize similar protocols.

PSTN 304 may be any circuit-based network that provides dedicated circuits to enable communication between mobile devices. Circuit-switching networks may be characterized as communication networks that establish dedicated circuits or channels between nodes and terminals to enable users to communication with one another.

Packet network 303 and PSTN 304 are accessed by mobile device 301 utilizing RAN 302. RAN 302 may be a single wireless network that utilizes conventional wireless communication protocols. Alternatively, RAN 302 may include multiple wireless networks utilizing different wireless protocols. Wireless protocols include, but are not limited to, code division multiple access (CDMA) 1xRTT, Global System for Mobile communications (GSM), High-Speed Packet Access (HSPA), Evolution-Data Optimized (EV-DO), EV-DO rev. A, Worldwide Interoperability for Microwave Access (WiMAX) and the like. Mobile device 301 may utilize one particular wireless protocol to communicate with application server 305 and different protocol for communicating with called device 306. For example, a data session may be established using EV-DO for exchanging information between mobile device 301 and application server 305 and a voice session may be established using CDMA for communication between mobile device 301 and called device 306.

Application server 305 comprises any computer system configured with software that functions as described herein that has the ability to exchange information with mobile device 301. Application server 305 could be comprised of a programmed general-purpose computer, although those skilled in the art will appreciate that programmable or special purpose circuitry and equipment may be used. Application server 305 may also be distributed among multiples platforms or devices.

Figure 4:
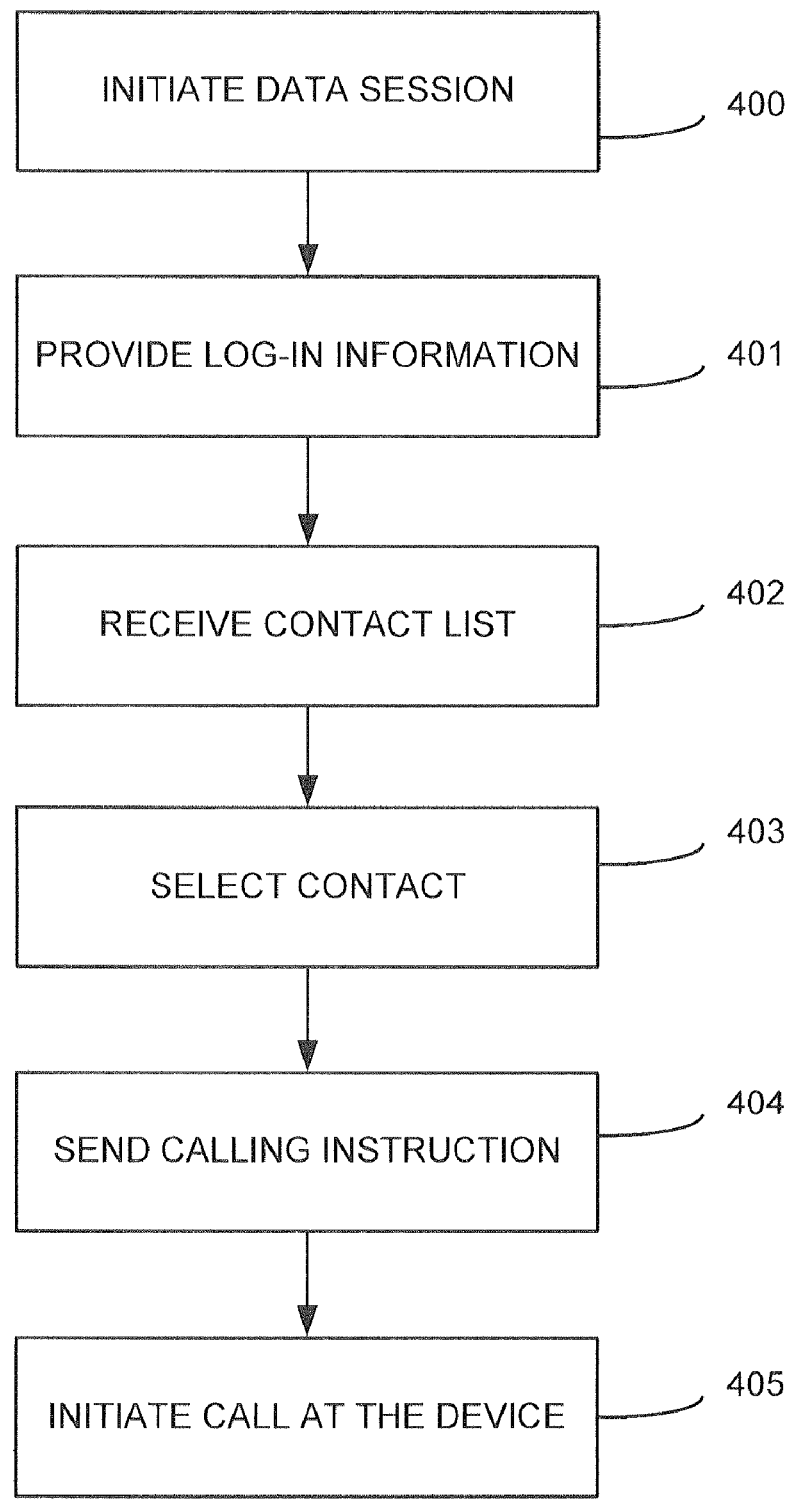
FIG. 4 is a flow diagram illustrating a method for initiating a call at a device.

Referring to FIG. 4, in operation, mobile device 301 initiates a data session with application server 305 utilizing RAN 302 and packet network 303 (400). In this example, RAN 302 may utilize WiMAX or EV-DO to establish a communication path with packet network 303. There is nothing limiting the type of RAN 302 protocol that could be used to establish a data communication path to application server 305.

Upon establishing a data session, mobile device 301 provides user log-in information to application server 305 to access any number of applications available to the user of mobile device 301 (401). One application that resides on application server 301 is a phone book that is associated with the user log-in account. Upon accessing the phone book application, application server 305 provides mobile device 301 with a list of contacts with associated contact numbers (402). The contact list may be provided to mobile device 301 in any number of data formats including text, Hypertext Markup Language (HTML), Extensible Markup Language (XML) or any other format that can be read by a browser on mobile device 301 or any other application or client residing on mobile device 301 that enables a user to read and select text.

The user at mobile device 301 then selects one of the contacts on the contact list and a data message with the selected contact is sent to application server 305 (403). The data message may be a short message service (SMS) message or text message, a session initiation protocol (SIP), or any other data messaging format, whether it is a signaling protocol or an instant messaging protocol.

Application server 305 receives the data message, retrieves the selected contact's phone number information and provides a calling instruction to mobile device 301 (404). Mobile device 301 now automatically initiates a call to called device 306 utilizing the calling instruction from application server 305 (405).

The calling instruction from application server 305 can include any information necessary for mobile device 301 to initiate communications to called device 306. For example, application server 305 may provide a SMS message containing the phone number of called device 306 and a script to initiate dialing the phone number for a traditional phone call. Alternatively, the script could initiate a text messaging session with called device 306. Additionally, the calling instruction could include an email address of called device 306 and an email is then sent to called device 306.

The contact list residing on application server 305 may be a static database that includes name entries and associated contact information. Additionally, the contact list may be dynamically updated by accessing remote or third-party databases. For example, the contact list could receive information from a third-party service provider that provides phone numbers, addresses and the like that are then associated with the contact name in the contact list. A user's contact list may include generic names describing a type of service provider. For example, a "hotel" or "pizza" may be generic entries in the contact list.

Figure 5:
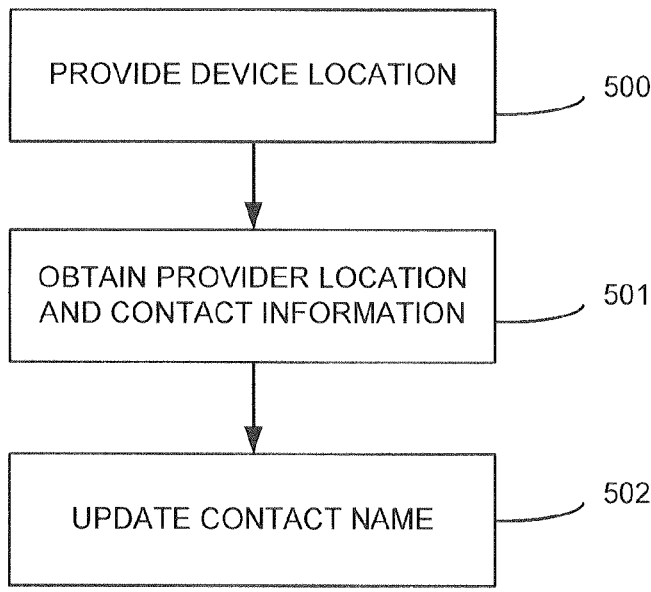
FIG. 5 is a flow diagram illustrating a method for updating a contact list using location information.

FIG. 5 illustrates an example of associating contact information with a contact in the contact list. In this embodiment, the location of mobile device 301 is provided to application server 305 (500). Location information for mobile device 301 can be obtained in any number of ways including, but not limited to, Global Positioning System (GPS), Advanced Forward Link Triangulation (AFLT), dead-reckoning or any other position determining methods.

Application server 305 then obtains location information for the generic contact name (501). Obtaining location information for service providers can be through any process, information system or database that allows an application to retrieve the location information of particular service providers. Examples include on-line databases and phonebooks, third-party mapping programs and other information sources that are accessible through a public network such as the Internet.

Based upon the location of mobile device 301, the generic contact name is updated with the contact information of the service provider that is in the closest proximity to mobile device 301 (502). The updated contact information is then provided to mobile device 301 as described above.

In another embodiment for associating a contact with contact information, the contact list includes a calendar function. The calendar contains multiple appointments or events that are scheduled during particular time windows. The events comprise information about the service provider including the name, phone number, email addresses and other contact information.

Figure 6:
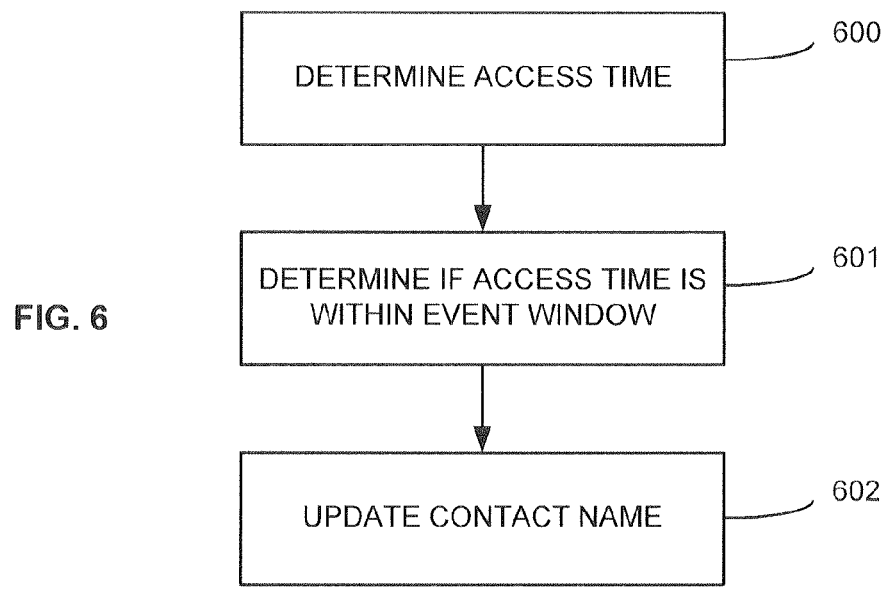
FIG. 6 is a flow diagram illustrating a method for updating a contact list using calendar information.

As illustrated in FIG. 6, the user at mobile device 301 accesses the contact list and the application server 305 notes the time the contact list is accessed (600). Application server 305 determines if the access time is within any of the event windows in the calendar (601). If the access time is within an event window, application server 305 updates the generic contact name with the contact information of the service provider listed in the event window (602). For example, the contact list has a generic name of "hotel" and the calendar includes an event describing the time, location and contact information of a particular hotel. When a user accesses application server 305 and selects "hotel" at a time that is within the event window, the contact information of the particular hotel is provided to the contact list and subsequently to mobile device 301 as described above.

Figure 7:
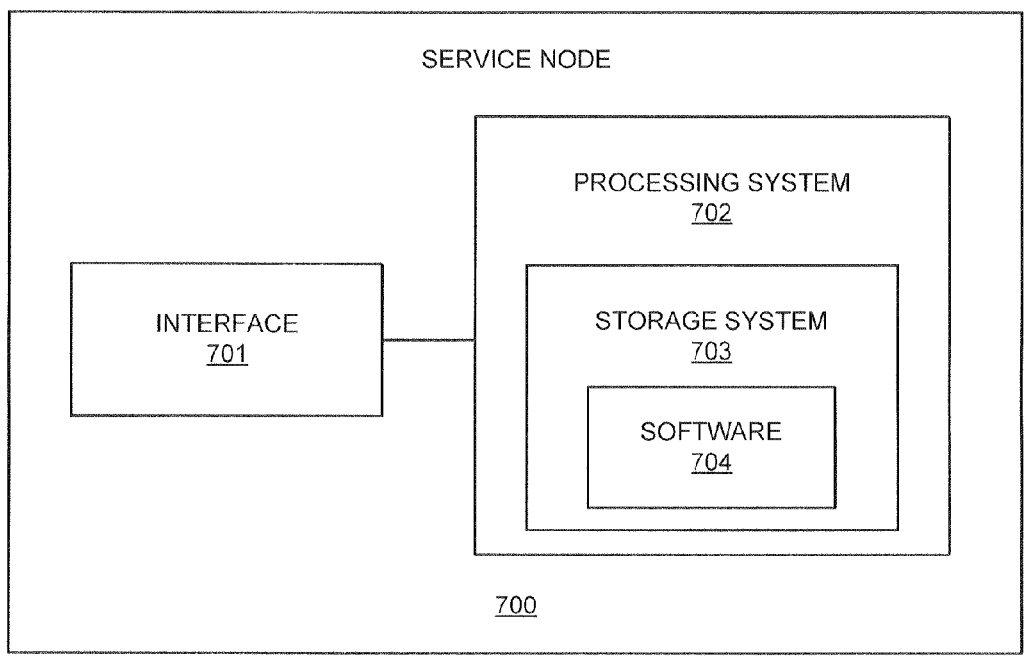
FIG. 7 is a block diagram illustrating a service node.

FIG. 7 illustrates service node 700. Service node 700 includes interface 701 and processing system 702. Processing system 702 includes storage system 703. Storage system 703 stores software 704. Processing system 702 is linked to interface 701. Service node 700 could be comprised of a programmed general-purpose computer, although those skilled in the art will appreciate that programmable or special purpose circuitry and equipment may be used. Service node 700 may be distributed among multiple devices that together comprise elements 701-704.

Interface 701 could comprise a network interface, modem, port, transceiver, or some other communication device. Interface 701 may be distributed among multiple communication devices. Processing system 702 could comprise a computer microprocessor, logic circuit, or some other processing device. Processing system 702 may be distributed among multiple processing devices. Storage system 703 could comprise a disk, tape, integrated circuit, server, or some other memory device. Storage system 703 may be distributed among multiple memory devices.

Processing system 702 retrieves and executes software 704 from storage system 703. Software 704 may comprise an operating system, utilities, drivers, networking software, and other software typically loaded onto a computer system. Software 704 could comprise an application program, firmware, or some other form of machine-readable processing instructions. When executed by processing system 702, software 704 directs processing system 702 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method in a network for initiating a communication service, the method comprising:

receiving an access request at a service node from a device to access a contact list;

providing the contact list to the device wherein the contact list has one or more contacts associated with contact information;

associating the contact information with each of the one or more contacts, wherein associating the contact information with each of the one or more contacts comprises determining an access time for the access request, associating a calendar with the contact list, wherein the calendar comprises an event time window and the contact information, and associating the contact information with the contact if the access time is within the event time window;

receiving a selection request from the device wherein the selection request comprises selecting one of the one or more contacts from the contact list; and sending a calling instruction to the device wherein the calling instruction comprises initiating a communication session from the device using the contact information.

2. The method of claim 1, wherein the contact information comprises one or more calling numbers.

3. The method of claim 1, wherein receiving the access request includes receiving log-in information of the user.

4. The method of claim 1, wherein receiving the access request comprises receiving the access request over a data session.

5. The method of claim 4, wherein the data session is performed over the Internet.

6. The method of claim 1, wherein providing the contact list comprises providing the contact list in HTML format.

7. The method of claim 1, wherein sending the calling instruction comprises sending the calling instruction using a short message service message.

8. The method of claim 1, wherein the calling instruction automatically initiates a call using a wireless network.

9. The method of claim 8, wherein the wireless network is a circuit network.

10. The method of claim 8, wherein the wireless network is a packet network.

11. The method of claim 8, wherein the wireless network is a CDMA 1xRTT network.

12. The method of claim 8, wherein the wireless network is a CDMA EV-DO network.

13. The method of claim 8, wherein the wireless network is a GSM network.

14. The method of claim 8, wherein the wireless network is a WiMAX network.

15. The method of claim 1, wherein associating the contact information with each of the one or more contacts comprises retrieving the contact information from a third-party database.

16. The method of claim 1, wherein associating the contact information with each of the one or more contacts further comprises:
   determining a device location for the device;
   determining a contact location for each of the one or more contacts; and
   associating the contact information with each of the one or more contacts based upon the device location and the contact location.

17. The method of claim 16, wherein associating the contact information with each of the one or more contacts comprises using the contact location that is the closest in proximity to the device location.

18. The method of claim 16, wherein determining the device location comprises receiving the device location from a user.

19. The method of claim 16, wherein determining the device location comprises receiving the device location from a positioning system.

20. The method of claim 16, wherein determining the contact location comprises receiving the contact location from a network.

21. The method of claim 1, wherein associating the calendar further comprises retrieving the calendar from the service node.

22. The method of claim 1, wherein associating the calendar further comprises retrieving the calendar from the device.

23. A communication system for initiating a communication service, the system comprising:
   a device; and
   a service node configured to receive an access request transmitted from the device to access a contact list, provide the contact list to the device wherein the contact list has one or more contacts associated with contact information, associate the contact information with each of the one or more contacts, receive a selection request transmitted from the device wherein the selection request comprises a selection of one of the one or more contacts from the contact list, and send a calling instruction for delivery to the device wherein the calling instruction comprises initiating a communication session from the device using the contact information;
   wherein the service node configured to associate the contact information with each of the one or more contacts comprises the service node configured to determine an access time for the access request, associate a calendar with the contact list, wherein the calendar comprises an event time window and the contact information, and associate the contact information with the contact if the access time is within the event time window.

24. The system of claim 23, wherein the device is a mobile device.

25. The system of claim 23, wherein the contact information comprises one or more calling numbers.

26. The system of claim 23, wherein the device communicates to the service node over a wireless network.

27. The system of claim 26, wherein the wireless network is a circuit network.

28. The system of claim 26, wherein the wireless network is a packet network.

* * * * *